United States Patent [19]

Harris et al.

[11] Patent Number: 5,062,000

[45] Date of Patent: Oct. 29, 1991

[54] "RESISTIVE FUSE" ANALOG HARDWARE FOR DETECTING DISCONTINUITIES IN EARLY VISION SYSTEM

[76] Inventors: John G. Harris, 446 S. Catalina Ave., Pasadena, Calif. 91106; Christof Koch, 1420 N. Harding Ave., Pasadena, Calif. 91104

[21] Appl. No.: 412,329

[22] Filed: Sep. 25, 1989

[51] Int. Cl.$^5$ .................. H04N 3/14; H04N 5/335; H01J 40/14

[52] U.S. Cl. .................. 358/213.27; 358/213.15; 358/93; 307/328; 250/208.1; 364/574

[58] Field of Search .................. 358/213.11, 213.15, 358/213.27, 213.28, 101, 166, 37, 106, 93; 307/328, 362, 363; 250/208.1, 208.2; 364/574, 811; 382/22, 28; 338/20; 337/166

[56] References Cited

U.S. PATENT DOCUMENTS

| | | | |
|---|---|---|---|
| 3,088,096 | 4/1963 | Steinbuch | 382/28 |
| 3,670,183 | 6/1972 | Ager et al. | 307/304 |
| 3,794,983 | 2/1974 | Sahin | 382/28 |
| 4,587,642 | 5/1986 | Curie et al. | 367/40 |
| 4,771,471 | 9/1988 | Kitamura | 382/41 |
| 4,786,818 | 11/1988 | Mead et al. | 250/578 |

OTHER PUBLICATIONS

Herbert Taub, Donald Schilling, "Digital Integrated Electronics", McGraw Hill, Inc., New York, 1977, pp. 70-84, 222-226.

*Primary Examiner*—James J. Groody
*Assistant Examiner*—Safet Metjahic
*Attorney, Agent, or Firm*—Donald A. Streck; Edward O. Ansell; Elgin Edwards

[57] ABSTRACT

This invention is primarily a "resistive fuse" circuit, being a hardware circuit that explicitly implements either analog or binary line processes in a controlled fashion. In a machine vision system for viewing an area and providing individual voltages representing the light intensity of a plurality of pixel positions within the area, this invention permits the method of operation for smoothing the individual voltages and simultaneously recognizing and preserving discontinuities in the area comprising the steps of, connecting respective ones of the individual voltages to respective ones of a plurality of intersections of a balanced network of indentical smoothing elements interconnected at intersections; allowing currents from the individual voltages to pass through the smoothing elements between the intersections and settle; within each element, providing a fixed resistance to voltages thereacross which are below a pre-established threshold amount and providing an infinite resistance to voltages thereacross which are above the pre-established threshold amount whereby as the currents flow the individual voltages are smoothed and discontinuities in the area reflected in the individual voltages are simultaneously recognized and preserved rather than being smoothed over; and, taking individual smoothed voltages from the intersections as data from the machine vision system for further processing. In a dynamically reconfigurable embodiment, the method further includes the steps of analyzing the individual smoothed voltages from the intersections to determine pixels associated with possible discontinuities and dynamically lowering said threshold amount in ones of the elements associated with pixels having possible discontinuities associated therewith whereby sensitivity to recognition of discontinuities is increased.

31 Claims, 6 Drawing Sheets

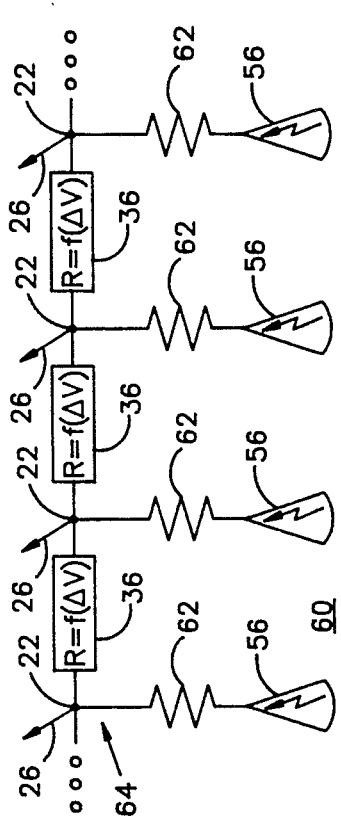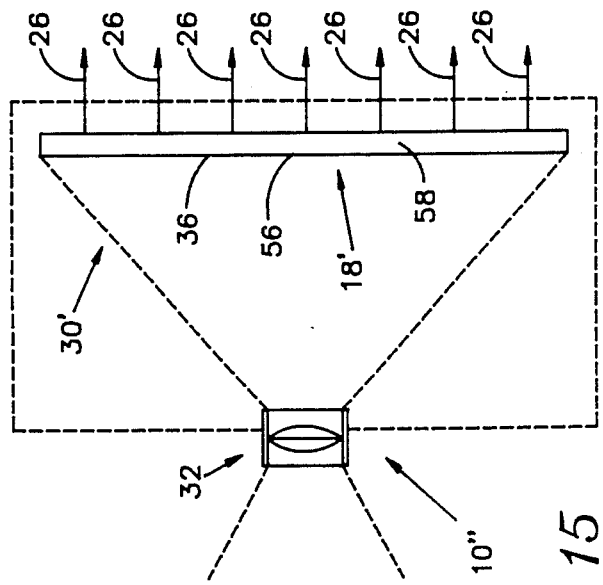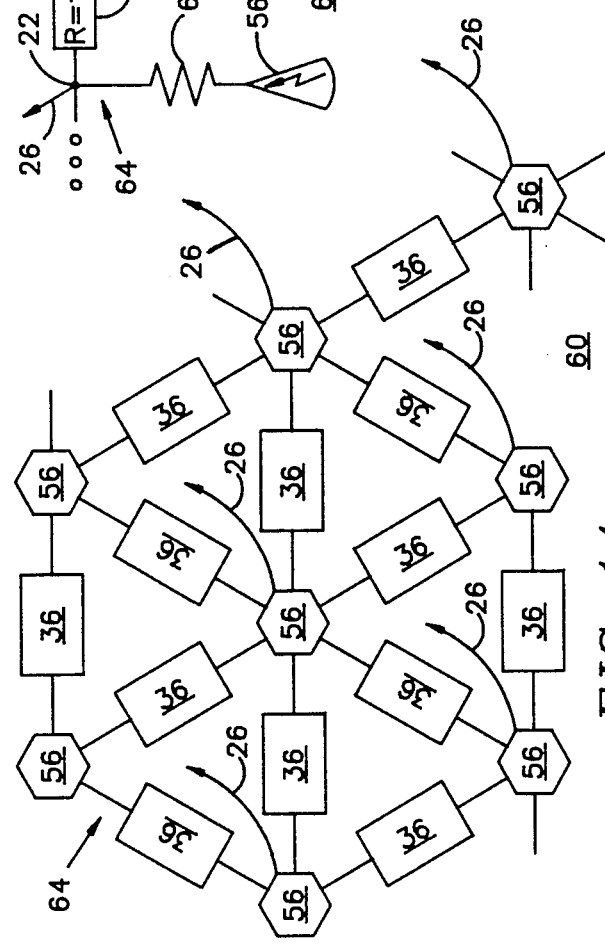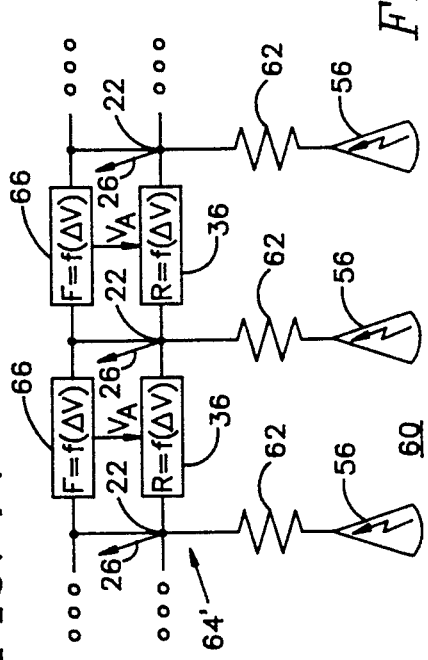

"RESISTIVE FUSE" ANALOG HARDWARE FOR DETECTING DISCONTINUITIES IN EARLY VISION SYSTEM

BACKGROUND OF THE INVENTION

The U.S. Government has certain rights in this invention, pursuant to ONR Young Investigator Award N00014-87-K-0519; Grant No. IST-8700064 granted by the National Science Foundation.

This invention relates to machine vision systems, and the like, and, more particularly, to a smoothing network which simultaneously recognizes and preserves discontinuities in data associated with a system providing individual voltages at an output thereof representing the intensity of a plurality of positions within an area, comprising, a plurality of identical smoothing elements each interconnected to equal numbered groups of others of the elements at intersections with respective ones of the individual voltages being connected to respective ones of the intersections, each of the intersections having an output therefrom providing a smoothed voltage representing an associated position, each of the smoothing elements providing a fixed resistance to voltages thereacross which are below a pre-established threshold amount and providing an infinite resistance to voltages thereacross which are above the pre-established threshold amount.

The detection of discontinuities in motion, intensity, color, and depth is a well studied but difficult problem in computer vision. Most early vision algorithms incorporate the generic constraint that variables such as intensity, surface orientation and reflectance, depth, optical flow, or texture vary slowly in space. Within the standard regularization approach, this is reflected in the use of stabilizing operators corresponding to various measures of smoothness. Thus, in the problem of interpolating a 2-D surface through sparse and noisy depth measurement, the final surface should be as close as possible to the initial data as well as being as smooth as possible; or, in the problem of computing optical flow from the time-varying intensity, the final flow field should be compatible with the locally measured velocity data as well as being smooth. Such limitations are acceptable for testing general approaches and algorithm; but, they are not practical for a general purpose machine vision system as surfaces often display discontinuities where the smoothness constraint is violated. Thus, the to-be-reconstructed surface may have been generated by an underlying piece-wise smooth or even piece-wise constant depth distribution; or, the 2-D velocity field induced by a rigid object moving/rotating in an otherwise stationary environment varies smoothly across the surface of the object but is zero beyond the contours of the object (since the background is stationary). What this amounts to is that a "real" machine vision system must be able to distinguish quasi "edges" where actual intensity edges may not exist. The quasi edges can be generally classified by the term "discontinuities" as they occur anywhere that there is a change in the characteristic being observed.

In recent years, a number of researchers have introduced powerful algorithms to deal with the representation of such discontinuities. For example, in 1984 Geman and Geman first proposed binary line processes to model discontinuities in intensity within the stochastic framework of Markov Random Fields. Discontinuities, however, are subject to various constraints, such that they should form along continuous contours, should not intersect, nor form parallel lines. Their approach was extended and modified in 1988 to account for discontinuities in depth, texture and color by Poggio and his collaborators as well as to discontinuities in the optical flow by Hutchinson, Koch, Luo and Mead. The principal drawback of the Geman and Geman-type method is the computational expense involved in minimizing the associated non-convex cost functionals using stochastic optimization methods; in particular, when numerous constraints (e.g. continuity of discontinuities) are incorporated. A number of authors have used deterministic methods to find the (local) minimum of the associated convex or non-convex variational functionals, with next-to-optimal results. For example, a rigorous deterministic approach has been championed by Blake and Zisserman. Their "graduated non-convexity" (GNC) algorithm bears many similarities to the above methods, and leads to excellent results in the case of piece-wise continuous reconstruction of surfaces.

All these prior art methods employ computationally-intensive digital computer approaches to the problem. Thus, the size, weight, and cost of the computing equipment makes it unrealistic for a useful system as well. Typically, an arrangement as depicted in FIG. 1 is utilized. The video camera 10 "sees" an area of view and generates raw data at 12 reflecting a 2-dimensional "picture" of the pixels comprising the area of view. This raw data is then input to a computer 14 for manipulation by the enhancement algorithms 16 (i.e. computer programs) contained therein. The connection from the video camera 10 to the computer 14 can be a solid connection as depicted or, in most cases, is a radio frequency data link of some kind. Most of us are familiar with the pictures sent back from outer space from various NASA projects and the "computer enhancement" which is conducted thereon since the satellite's size and weight constraints limit it to transmitting raw data. The transmitted data, of course, picks up much "noise" in the process, which adds to the difficulty of the problem. If a video camera could be provided that output data which had been smoothed and discontinuity detected at the source, the subsequent processing of that data would be greatly reduced. If the camera could be made small and lightweight enough, it could even be placed aboard satellites and used in similar size/weight constrained applications.

Analog computational techniques were in substantial use for certain applications at one time but fell into general disuse upon the advent of readily available digital computers. More recently, however, (and particularly with the advent of ultra-small implementations of the components thereof in VLSI logic and the like), the unique benefits of analog computing circuits in certain applications is once again gaining great favor in the computing art. Specialized analog circuits can be made extremely small and lightweight as well as being extremely fast as compared to their digital counterpart. This is particularly true where (as in the case of machine vision) the "problem" to be solved is dynamic in nature and involves massive parallel computations. For example, in 1985 Poggio and Koch showed how standard early vision regularization algorithms can map onto simple resistive networks. Finding the minimum of the standard regularized and quadratic cost functional is equivalent to finding the state of least power dissipation in an appropriate electrical network, where the data are given by injecting current into certain nodes and the solution by the stationary voltage distribution.

FIG. 2 shows an appropriate prior art network 18 for membrane-type surface interpolation, where the "strength" of smoothing is given by the value of the horizontal grid conductance. As applied to the machine vision problem, the network 18 has a voltage input 20 at each intersection 22 of the network 18. Each voltage input 20 is from some sort of a viewing device (e.g. a charge coupled device as symbolized by the voltage cell 58, or a phototransistor 56 of a phototransistor array) and represents the light intensity of an associated pixel position in the viewing area. It should be noted at this point that Carver Mead has produced a network such as that depicted in FIG. 2 on a single chip with the phototransistors 56 formed on the chip as well. Such an arrangement is commonly referred to as a "silicon retina". The value of each of the resistors 24 interconnecting the intersections 22 determines the amount of smoothing which will take place. The smoothed voltage outputs 26 are taken from the same intersections 22 after the network 18 settles. The problem is that while the smoothing factor can be adjusted (by changing the values of the resistors 24), smoothing still takes place across the whole field of vision; that is, there is no provision for edge or discontinuity detection as part of the smoothing process. As a consequence, instead of being identified (as would be desirable), any discontinuities are actually masked by being smoothed into the surrounding data. A prior art viewing system in the manner of FIG. 1 but employing an analog smoothing network 18 like that of FIG. 2 is shown in greatly simplified form in FIG. 3. Note that the camera 10 is connected to the network 18 and supplies the raw data thereto (at the intersections 22 thereof) while the smoothed data from the intersections 22 is output to the computer 14 for further processing.

Wherefore, it is an object of this invention to provide a quasi-resistive element which can be employed in a network such as that of FIG. 1 in place of the resistors 16 to provide both smoothing and discontinuity detection.

It is another object of this invention to provide a machine vision data network which provides data enhancement in the form of smoothing as well as discontinuity detection and identification.

It is still another object of this invention to provide a machine vision data network providing smoothing of the data without smoothing over identified discontinuities.

It is yet another object of this invention to provide a machine vision optical and data generation system which includes an enhancement network as part of the viewing and data generation portion which providing smoothing of the data and identification of discontinuities.

Other objects and benefits of the invention will become apparent from the detailed description which follows hereinafter when taken in conjunction with the drawing figures that accompany it.

SUMMARY

The foregoing objects have been achieved in part by the smoothing network of the present invention which simultaneously recognizes and preserves discontinuities in data associated with a viewing area of a machine vision system having a video device or photoreceptor array providing individual voltages at an output thereof representing the light intensity of a plurality of pixel positions within the viewing area, comprising, a plurality of identical smoothing elements each interconnected to equal numbered groups of others of the elements at intersections with respective ones of the individual voltages being connected to respective ones of the intersections, each of the intersections having an output therefrom providing a smoothed voltage representing an associated pixel position, each of the smoothing elements providing a fixed resistance to voltages thereacross which are below a pre-established threshold amount and providing an infinite resistance to voltages thereacross which are above the pre-established threshold amount.

For compact and lightweight implementations, the balanced network may be attached directly to a video device or integrated within a photoreceptor array. The preferred network comprises a generally hexagonal structure wherein each the intersection is connected by six elements to six other intersections.

In the preferred embodiment, each element comprises, an absolute-value circuit having a pair of inputs for the connection of a pair of voltage inputs $V_1$ and $V_2$ from respective ones of a pair of the intersections thereto and a saturating resistor circuit connected across the pair of inputs and controlled by the absolute-value circuit to create a resistive fuse circuit. Additionally, the saturating resistor circuit has a pair of first transistors connected in series between the pair of inputs and a second transistor connected to control the flow of current through the first transistors and the absolute-value circuit is connected to pull current from the saturating resistor circuit as a function of the absolute voltage difference between $V_1$ and $V_2$ and thereby control the amount of current the second transistor allows to flow through the first transistors. In one embodiment, the absolute-value circuit pulls current from the saturating resistor circuit on a linear basis below the pre-established threshold amount and then rolls off until it ultimately pulls all the current from the saturating resistor circuit upon reaching the pre-established threshold amount. In another embodiment, a gating transistor is additionally connected in series with the first transistors and connected to be operated by the current pulled by the absolute-value circuit from the saturating resistor circuit so that the absolute-value circuit pulls current from the saturating resistor circuit on a linear basis below the pre-established threshold amount whereby the first transistors pass current like a resistor and turns off the gating transistor upon reaching the pre-established threshold amount whereby the first transistors no longer pass current like an open fuse.

Preferably, there is a control transistor connected to control the flow of current from the saturating resistor circuit whereby the slope of the apparent resistance of the first transistors is adjusted and set by a voltage applied to the gate of the control transistor.

A voltage $V_B$ is connected to control the nominal amount of "resistance" (i.e. the current "slope") presented by the first transistors while a voltage $V_A$ is connected to determine the magnitude of the current pulled away by the absolute-value circuit whereby $V_A$ actually controls the threshold at which the current through the first transistors cuts off. Preferably, feedback means are provided for making $V_A$ a controllable quantity as a function of detected discontinuities whereby the characteristics of the resistive fuse can be changed dynamically to better fit actual sensed conditions.

In an alternate embodiment providing dynamic self-reconfiguration, input means are associated with each of the identical smoothing elements for dynamically changing the pre-established threshold amount. Preferably, feedback means are connected to the input means associated with each of the identical smoothing elements and to selected ones of the intersections to receive the smoothed voltage therefrom for dynamically changing the pre-established threshold amount as a function of pre-established conditions relating to the smoothed voltage from the selected ones of the intersections.

DESCRIPTION OF THE DRAWINGS

FIG. 13 is a simplified drawing of a 1-dimensional network with phototransistor inputs as built and tested by the inventors herein.

FIG. 14 is a simplified drawing of a portion of a 2-dimensional network with incorporated phototransistor inputs as implemented on a single chip according to the present invention.

FIG. 15 is a simplified drawing of a self-enhancing video camera which could be constructed according to the present invention.

FIG. 16 is a simplified drawing in the manner of FIG. 13 showing the resistive fuse of the present invention in a feedback driven configuration wherein the cutoff voltage is a controllable quantity as a function of detected discontinuities whereby the characteristics of the resistive fuse can be changed dynamically to better fit actual sensed conditions.

DESCRIPTION OF THE PREFERRED EMBODIMENT

While the examples contained hereinafter are directed primarily to a machine vision system, as those skilled in the analog computational art will readily recognize and appreciate, the basic "resistive fuse" of the present invention as incorporated into a voltage/data smoothing network can be used to advantage in other similar applications as well; for example, in the smoothing of audio signals etc. Similarly, the "vision" taking place could be with respect to infrared (IR) detection as in the case of so-called "night vision" glasses, or the like. It is the applicants' intent, therefore that the breadth accorded the invention and the appended claims be such as to reflect the true scope and spirit of the invention and not be limited by the use of particular examples and a particular field of use selected only for disclosure purposes.

Figure 3:
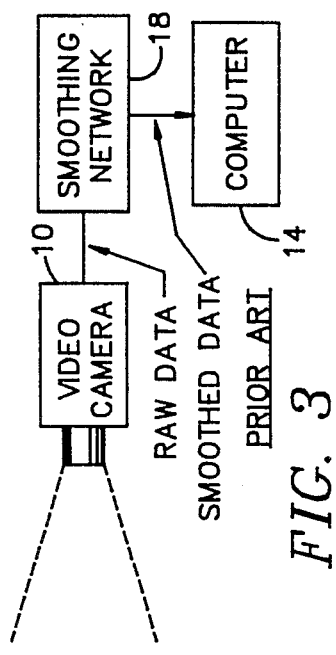
FIG. 3 is a simplified drawing depicting a prior art machine vision system as it would be constructed to employ the smoothing resistive network of FIG. 2.
Figure 4:
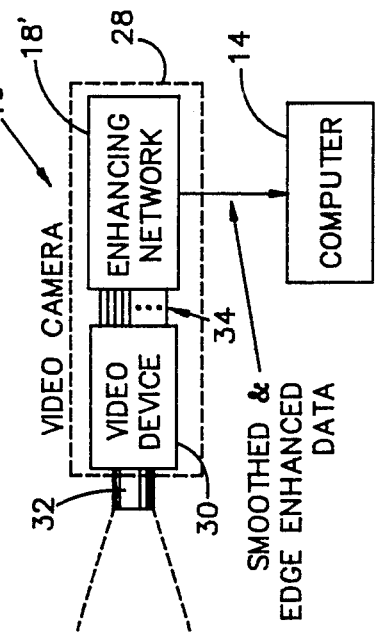
FIG. 4 is a simplified drawing depicting a machine vision system as it could be constructed according to the present invention and employing an enhancing network also according to the present invention therein.
Figure 1:
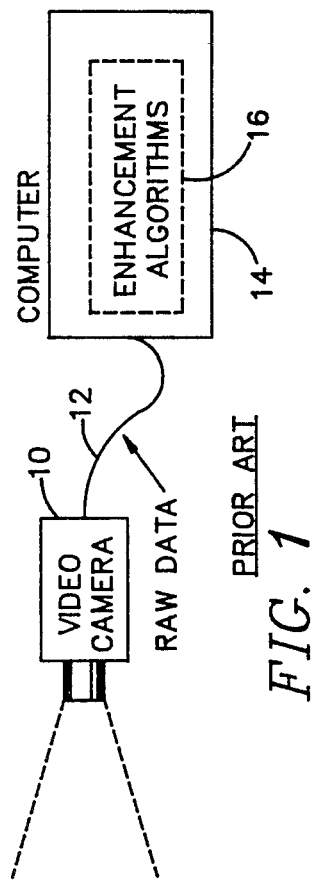
FIG. 1 is a simplified drawing depicting a prior art machine vision system wherein raw data from the video camera is fed directly to a digital computer for processing with enhancement algorithm programs.

A simplified, "video camera" according to the present invention in a non-preferred embodiment and which can be employed for certain applications of machine vision is depicted in functional block diagram form in FIG. 4 where it is generally indicated as 10'. The video camera 10' comprises in one case 28 some sort of a video device 30 (such as a charge coupled device (CCD) or a phototransistor array) providing separate voltage outputs for each pixel position viewed by the lens assembly 32. The respective pixel voltages on the connecting wires 34 are connected to respective intersections 22 of an enhancing network 18' according to the present invention, which will be described in detail shortly. The enhancing network 18' does smoothing and discontinuity identification and augmentation directly at the video device 30. The thus enhanced pixel data from the network 18' is then output from the camera 10' to, for example, the computer 14 for processing.

Figure 2:
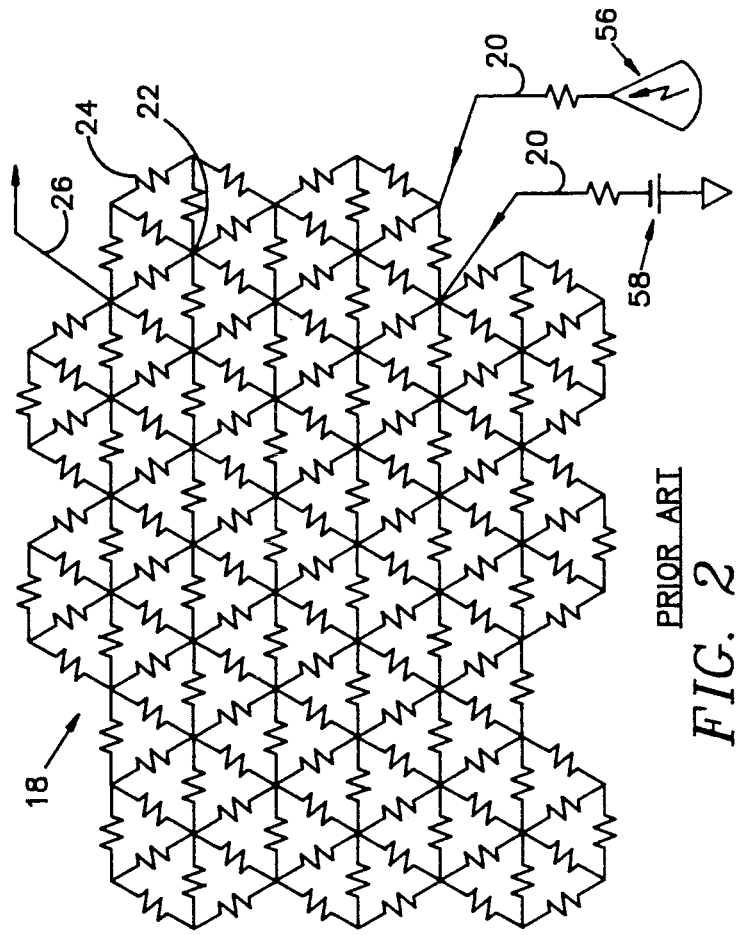
FIG. 2 is a prior art resistive network for fitting the smoothest surface f through sparse and noisy data d.
Figure 5:
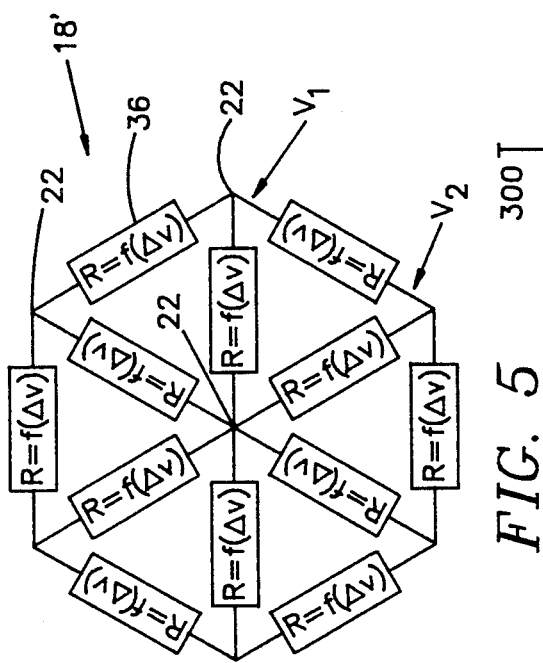
FIG. 5 is a simplified drawing depicting a portion of an enhancing network also according to the present invention and employing the novel resistive fuse circuits thereof therein.

While the inventors herein have built and tested a rectangular network, as depicted in FIG. 5, the preferred network 18' comprises a hexagonal network as in the prior art network 18 of FIG. 2; but, with the resistors 24 thereof replaced with what will be referred to hereinafter as "resistive fuse" elements 36. The elements 36 have been characterized as resistive fuses in that they behave like a normal resistor when the voltage across the element 36 is within a given range; but, virtually "open" when the voltage exceeds a threshold amount. As those skilled in the art will readily recognize, it is this performance characteristic that is necessary to identify discontinuities and include them as virtual "edges" within the data rather than smoothing them into the surrounding data. In other words, the resistance of the elements 36 is a function of the delta voltage from the input ($V_1$) to the output ($V_2$) thereof. As will be returned to later herein, it is also preferred that the network 18' be of the silicon retina variety with the phototransistors 56 which provide the voltage inputs to the intersections 22 formed on a common chip with the network 18'.

Figure 7:
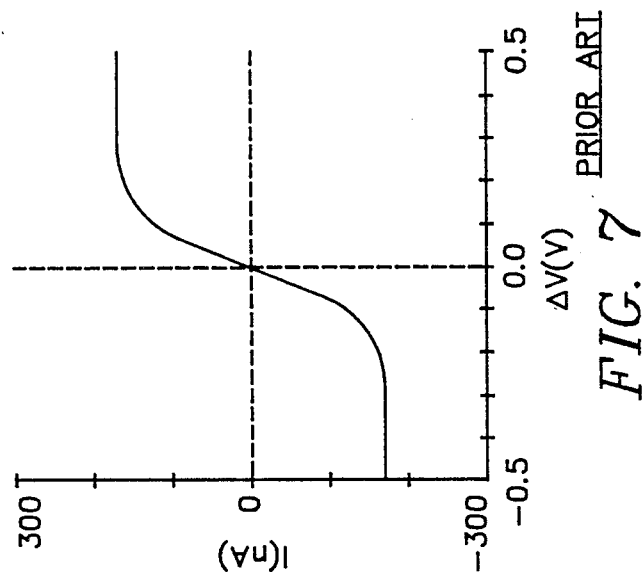
FIG. 7 is a graph of voltage versus current for a prior art saturating resistor circuit.
Figure 6:
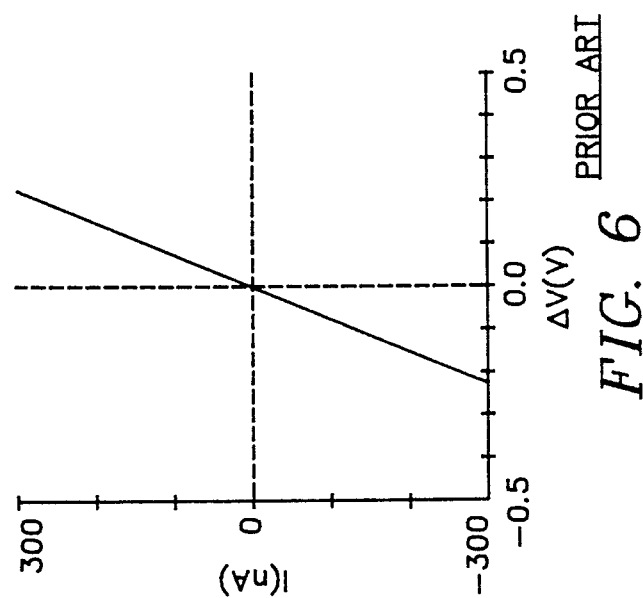
FIG. 6 is a graph of voltage versus current for a prior art pure resistive circuit.

The performance characteristics (Voltage, V, versus Current, I) of a pure resistive circuit is depicted in FIG. 6. This is the performance of the resistors 24 of the prior art network 18 of FIG. 2. The corresponding performance characteristics of a saturating resistor circuit as implemented employing subthreshold, analog CMOS VLSI circuits as also developed for various sensory tasks by Carver Mead is shown in FIG. 7. This latter real-time, low power, and robust technology has provided the basis for the specialized resistive circuits (i.e. the resistive fuses) of this invention now to be described in detail.

Figure 9:
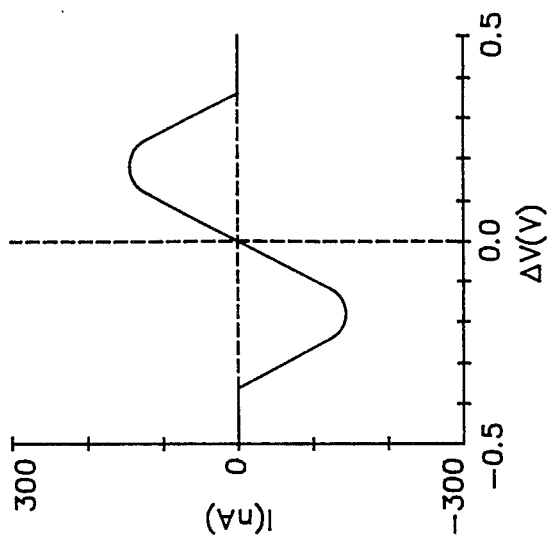
FIG. 9 is a graph of voltage versus current for an "analog" resistive fuse circuit according to the present invention in another embodiment thereof.
Figure 8:
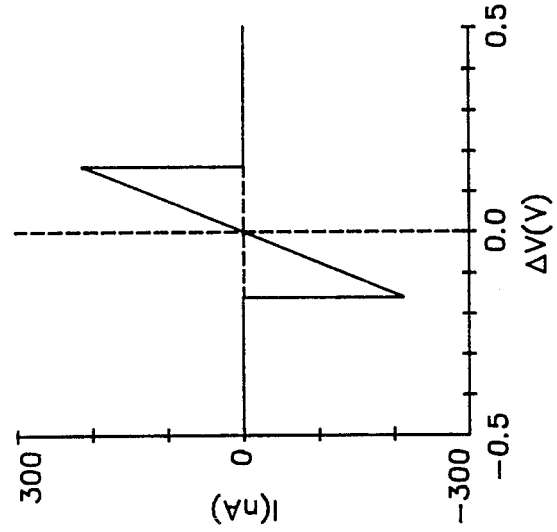
FIG. 8 is a graph of voltage versus current for a "binary" resistive fuse circuit according to the present invention in one embodiment thereof.

The resistive fuse elements 36 of the present invention have been implemented and tested in two forms having performance as depicted in FIGS. 8 and 9. The actual circuits for both implementations will be discussed in detail shortly. FIG. 8 depicts what the inventors herein have referred to as a "binary" implementation because the resistive fuse circuit depicted there in is bi-stable in performance; that is, it acts as a resistor for delta-Vs (i.e. $|V_1-V_2|$) less than the threshold and "opens" (i.e. passes no further current) immediately upon reaching the threshold. By contrast, FIG. 9 depicts what the inventors herein have referred to as an "analog" implementation because the resistive fuse circuit depicted there again acts as a resistor for delta-Vs less than the threshold and slowly rolls off until it has reached the "open" position upon reaching the threshold.

Figure 10:
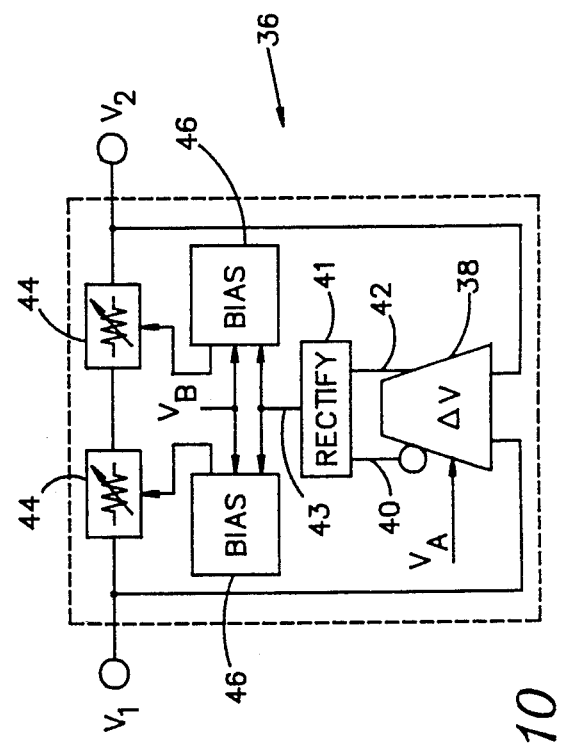
FIG. 10 is a simplified functional block diagram of a resistive fuse circuit according to the present invention.

A resistive fuse 36 according to the present invention is shown in simplified functional block diagram form in FIG. 10. The two voltages $V_1$ and $V_2$ into the resistive fuse 36 are input to a differential circuit 38 having negative and positive outputs 40 and 42, respectively (depending upon whether $V_1$ or $V_2$ is the greater). The outputs 40 and 42 are rectified at 41 to provide an absolute value of delta-V out at 43. There are two actual resistive elements 44 of the resistive fuse 36 since this portion is a slightly modified version of the saturating resistor circuit of Carver Mead, which was previously mentioned. The performance of the resistive elements 44 is controlled by the absolute value of delta-V as modified by the bias circuits 46 as a function of the output of the rectifier circuit 41 as input thereto. The slope of the resistive portion of the curve is set by the value of $V_B$, which is also input to the bias circuits 46. The cutoff point of the resistive portion of the curve (i.e. the threshold point) is set by the value of $V_A$, which is an input to the differential circuit 38.

Figure 11:
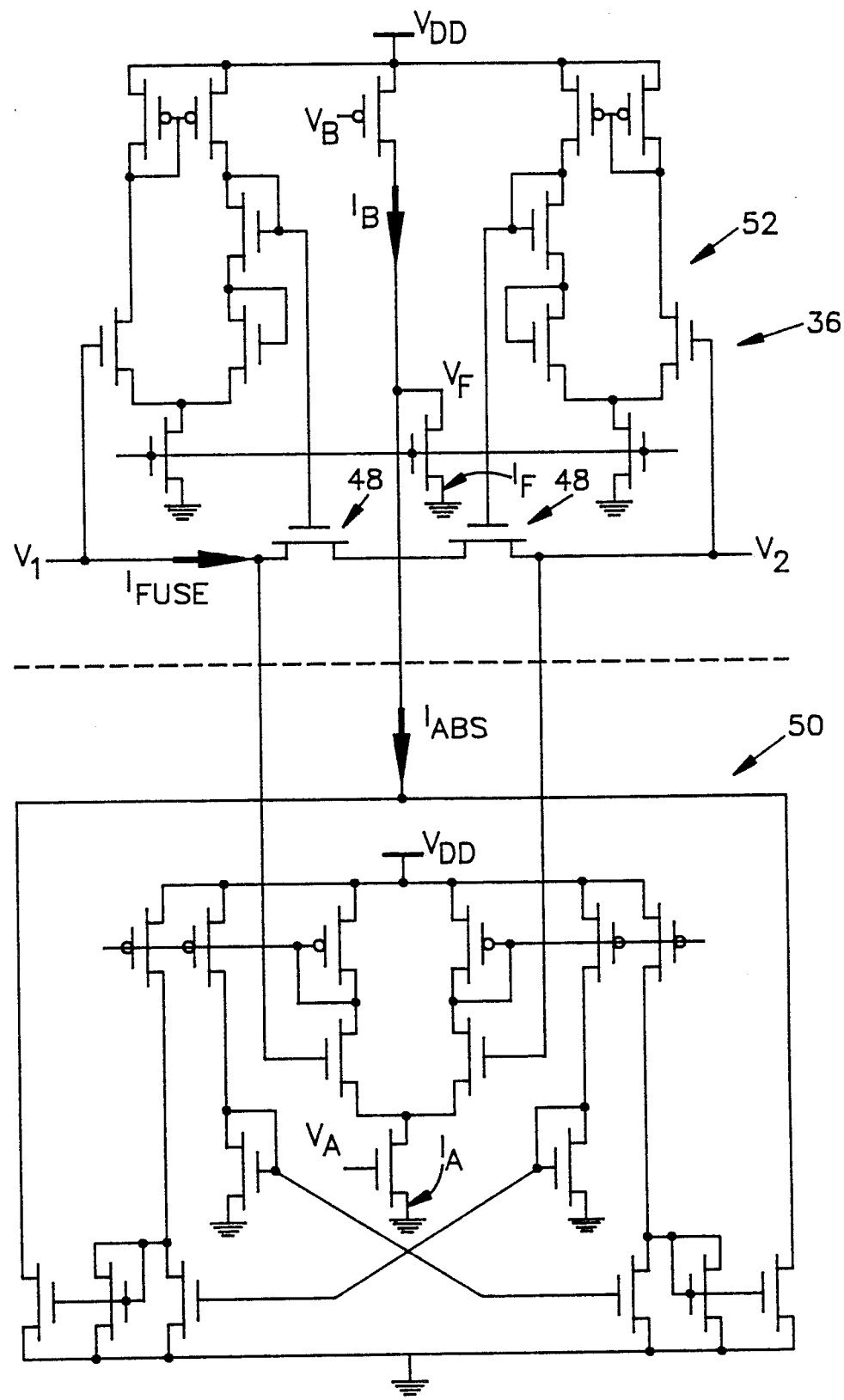
FIG. 11 is a circuit diagram of a resistive fuse circuit according to the present invention corresponding to the graph of FIG. 9.

Turning now to FIG. 11, a circuit is shown for implementing the "analog" resistive fuse 36 graphed in FIG. 9. The portion above the dashed line is essentially the resistive elements 44 and bias circuits 46 of FIG. 10 with a p-type pullup transistor that sets the nominal resistance of the fuse. Note that in subthreshold operation, the current through a transistor varies exponentially with the gate-to-source voltage. The portion below the dashed line is essentially the differential circuit 38 and rectifier circuit 40 of FIG. 9 and performs a saturating absolute-value operation. Since such circuits are well known to those skilled in the art, the performance of the individual components thereof will not be addressed in detail in the interest of simplicity and the avoidance of redundancy. $V_B$ controls the nominal amount of "resistance" presented by controls the nominal amount of "resistance" presented by the transistors 48 while $V_A$ determines the magnitude of the current pulled away by the absolute-value circuit 50. This aspect of the invention will be addressed in further detail shortly. As those skilled in the art will readily recognize, the current, $I_{FUSE}$, flowing from $V_1$ to $V_2$ (and, therefore, the apparent "resistance" of the transistors 48) depends on the current, $I_{ABS}$, pulled off by the absolute value circuit 50. As those skilled in the art will also recognize, the positive parts of the outputs of a dual-output wide-range transconductance amplifier are combined to create the current $I_{ABS}$. When all the available current is being pulled off by the absolute value circuit 50, no current can flow from $V_1$ to $V_2$ and the "resistance" of the saturating resistor circuit 52 is apparently infinite. For small delta-V, the resistive portion of the circuit operates as a linear resistor whose nominal resistance is set by $I_B$. Because we are working in the subthreshold region, $I_F$ and thus the resistance can be varied over five orders of magnitude. This is an important aspect of this invention. For large delta-V, the resistor saturates and provides a constant current of $I_F/2$. This is because when delta-V is large, $I_A$ increases above the current supplied by the p-type pull-up transistor, and $V_F$ is pulled to ground, shutting off the resistor. In between these extremes, the resistive fuse 36 exhibits a gradual transition.

What has been shown to this point, therefore, is an analog, purely deterministic approach to locating discontinuities in the case of interpolating noisy and sparsely sampled depth data. It leads to a very simple and elegant circuit implementation in terms of a two-terminal, nonlinear, voltage-controlled resistor termed by the inventors a "resistive fuse". Of interest to some of those skilled in the art, the tested embodiment as referred to above was implemented in analog CMOS.

Figure 12:
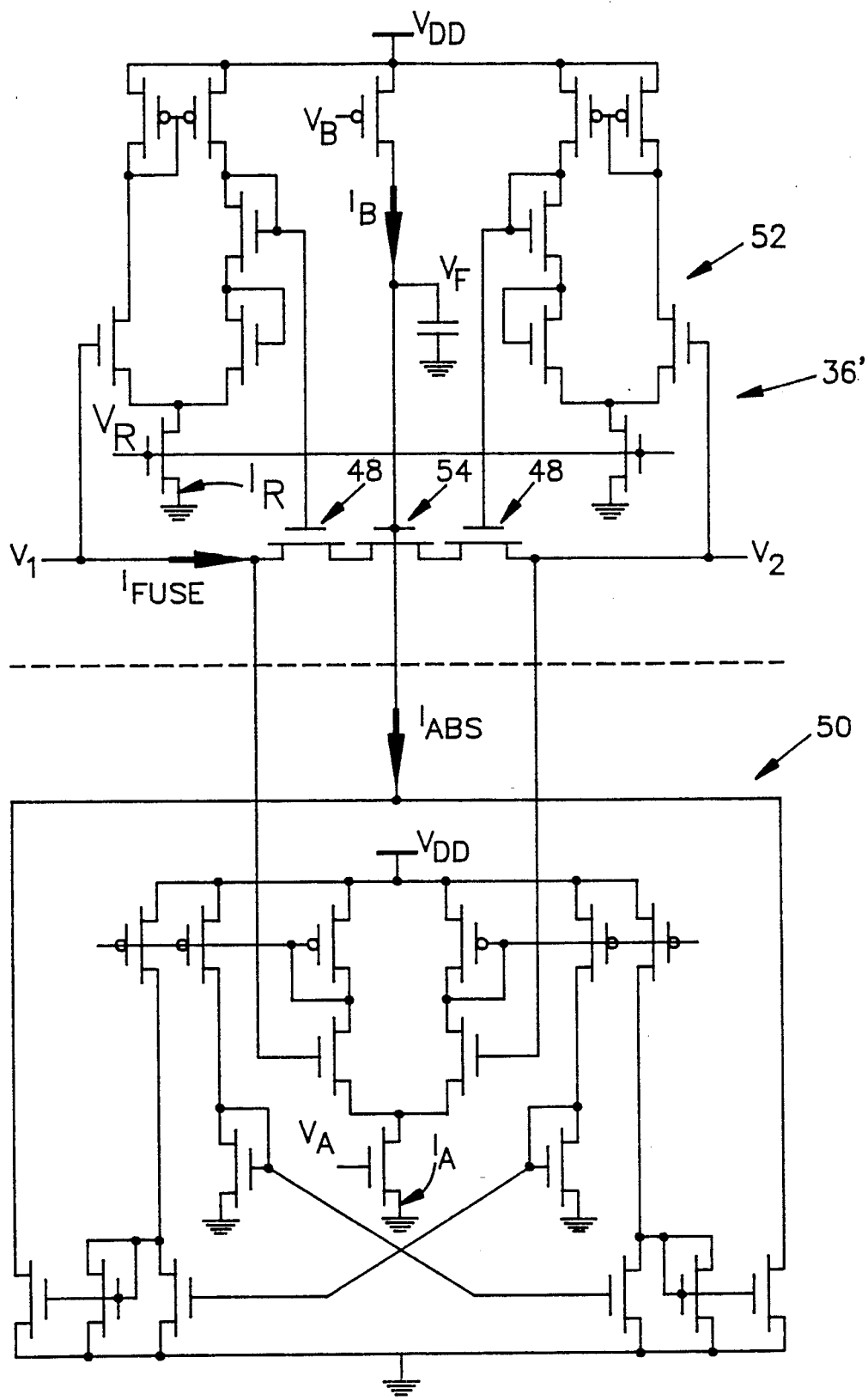
FIG. 12 is a circuit diagram of a resistive fuse circuit according to the present invention corresponding to the graph of FIG. 8.

FIG. 12 is the circuit of a resistive fuse 36' as modified to obtain a high-gain characteristic, i.e. to implement the "binary" performance depicted in the graph of FIG. 8. As in the circuit of the resistive fuse 36 of FIG. 11, a saturating resistor circuit 52 and an absolute-value circuit 50 are combined to create the "fuse"; however, different from the circuit of FIG. 11, the absolute-value circuit 50 discharges the gate of a pass transistor 54 that has been added in the resistance path. The pass transistor 54 acts as a binary switch that is opened or closed dependent on whether or not the current, $I_{ABS}$, pulled off by the absolute value circuit 50 is greater than the threshold current provided by $V_B$. $V_R$ provides independent control of the resistance of the resistive fuse 36' when the binary switch is closed. This implementation comprises a high-gain resistive fuse circuit, i.e. a circuit that does not have a large incrementally active region in its I-V curve). Actual circuit tests of the high-gain resistive fuse 36' as performed by the inventors herein show I-V curves that look like those of the infinite-gain fuse in FIG. 8. Instead of feeding the absolute-value current back to the resistor bias circuits, current is fed back to a pass gate (i.e. transistor 54) that acts as a binary switch in the current path. When $I_B > I_{ABS}$ the voltage on the gate of the binary switch ($V_F$) is charged to $V_{DD}$. On the other hand, when $I_B < I_{ABS}$, $V_F$ is pulled to ground, effectively open-circuiting the resistor. The resistance of the resistor is controlled by $V_R$, which sets the bias current $I_R$.

As mentioned earlier, in the resistive fuses 36, 36' of this invention, $V_B$ controls the nominal amount of "resistance" (i.e. the current "slope") presented by the transistors 48 while $V_A$ determines the magnitude of the current pulled away by the absolute-value circuit 50. This latter aspect is an important point of novelty of this invention in that $V_A$ actually controls the threshold at which the current cuts off. Thus, by making $V_A$ a controllable quantity, the characteristics of the resistive fuse 36, 36' can be changed dynamically—a most intriguing possibility. In this regard, consider first the simplified circuit of FIG. 13 which represents a 1-dimensional test case of a self-enhancing silicon retina 64 implemented according to the present invention as actually built and tested by the inventors herein. Thus, on one chip substrate 60 there are a plurality of resistive fuses 36 connected at intersections 22 and having phototransistors 56 connected to the intersections 22 through confidence resistors 62. A portion of a preferred hexagonal configuration of the self-enhancing silicon retina 64 for 2-dimensional work is depicted in simplified form in FIG. 14. As will be readily recognized by those skilled in the art, the self-enhancing silicon retina 64 of this invention can be incorporated into a "camera" configuration as depicted in simplified form in FIG. 15 to provide a very small and lightweight camera 10" which provides smoothed and edge enhanced pixel output voltages on the output lines 26 therefrom.

Turning now to FIG. 16, we can now see how the present invention can be employed in a feedback configuration to dynamically change the performance characteristics according to actually encountered conditions. For ease of understanding, the simple 1-dimensional silicon retina 64 of FIG. 13 is used for the example. Thus, in FIG. 16, we see a dynamically reconfigurable, self-enhancing silicon retina 64' according to the present invention in an alternate embodiment. Each resistive fuse 36 has an associated logic element 66 connected to provide a feedback voltage to $V_A$. The logic elements 66 are connected to sense the delta-Vs of the network. For one simple example, they might be connected in parallel with each of the resistive fuses 36 as shown. Other, more complex, interconnections might, of course, be implemented as necessary to the particular problem being addressed. As an example of where such an approach might be valuable, once again consider a machine vision system as has been employed as a general example throughout this application. Where one finds an intensity discontinuity, one often also finds an actual edge. Thus, when an intensity discontinuity is detected by particular logic elements 66, the logic elements 66 would change the feedback voltage to $V_A$ of their associated resistive fuses 36 so as to lessen the delta-V required before the resistance opened. In other words, the detection of an edge would take much less delta-V, i.e. the sensitivity of the particular resistive fuses 36 in the region of the suspected edge would be increased. Thus, for instance, motion discontinuities would only form at those locations where intensity discontinuities were previously detected by dynamically adjusting the threshold via $V_A$.

In conclusion, computer simulations have shown that detection of discontinuities in surface orientation, such as occurring along creases, is feasible in problems such as edge detection and surface interpolation and can be incorporated into thin-plate interpolation circuits. With the resistive fuse of this invention (and in particular the dynamically reconfigurable, self-enhancing embodiment thereof), we thus have all the elementary circuit elements in hand—phototransistors for on-chip image acquisition, resistive networks for smoothing, and resistive fuses for detecting discontinuities—to design analog, resistive network chips to compute the 2-D optical flow field in the presence of motion discontinuities, the depth and depth discontinuities in 2-D images, as well as intensity discontinuities.

Wherefore, having thus described our invention, what is claimed is:

1. In a system providing individual voltages at an output thereof representing the characteristics of a plurality of positions the improvement for smoothing the individual voltages and simultaneously recognizing and preserving discontinuities contained therein comprising:

a plurality of substantially identical smoothing elements, each of said smoothing elements comprising means for providing a fixed resistance to voltages thereacross which are below a pre-established threshold amount and an infinite resistance to voltages thereacross which are above said pre-established threshold amount;

a plurality of intersections comprising means for interconnecting said smoothing elements in a balanced network thereof, respective ones of the individual voltages being connected to respective ones of the intersections, each of said intersections having an output therefrom providing a smoothed voltage representing an associated position.

2. The improvement to a system of claim 1 wherein:
the system is a machine vision system having viewing means for providing the individual voltages in relation to pixel position in a viewing area and said balanced network is attached directly to the viewing means.

3. The improvement to a system of claim 1 wherein:
said network comprises a generally hexagonal structure wherein each said intersection is connected by six said elements to six other said intersections.

4. The improvement to a system of claim 1 wherein each said element comprises:
a) an absolute-value circuit having a pair of inputs for the connection of a pair of voltage inputs $V_1$ and $V_2$ from respective ones of a pair of said intersections thereto; and,
b) a saturating resistor circuit connected across said pair of inputs and controlled by said absolute-value circuit to create a resistive fuse circuit.

5. The improvement to a system of claim 4 wherein:
a) said saturating resistor circuit has a pair of first transistors connected in series between said pair of inputs and a second transistor connected to control the flow of current through said first transistor; and,
b) said absolute-value circuit is connected to pull current from said saturating resistor circuit as a function of the absolute voltage difference between $V_1$ and $V_2$ and thereby control the amount of current said second transistor allows to flow through said first transistors.

6. The improvement to a system of claim 5 wherein:
said absolute-value circuit pulls current from said saturating resistor circuit on a linear basis below said pre-established threshold amount and rolls off to pull all current from said saturating resistor circuit upon reaching said pre-established threshold amount.

7. The improvement to a system of claim 5 and additionally comprising:
a gating transistor connected in series with said first transistors and connected to be operated by the current pulled by said absolute-value circuit from said saturating resistor circuit so that said absolute-value circuit pulls current from said saturating resistor circuit on a linear basis below said pre-established threshold amount whereby said first transistors pass current like a resistor and turns off said gating transistor upon reaching said pre-established threshold amount whereby said first transistors no longer pass current like an open fuse.

8. The improvement to a system of claim 5 wherein said first resistors provide an apparent resistance, and additionally comprising:

a control transistor connected to control the flow of current from said saturating resistor circuit whereby the slope of the apparent resistance of said first transistors is adjusted and set by a voltage applied to a gate of said control transistor.

9. The improvement to a system of claim 1 and additionally comprising:

input means associated with each of said identical smoothing elements for dynamically changing said pre-established threshold amount.

10. The improvement to a system of claim 9 and additionally comprising:

feedback means connected to said input means associated with each of said identical smoothing elements and to selected ones of the intersections to receive said smoothed voltage therefrom for dynamically changing said pre-established threshold amount as a function of pre-established conditions relating to the smoothed voltage from said selected ones of the intersections.

11. A smoothing network which simultaneously recognizes and preserves discontinuities in data associated with a viewing area of a machine vision system having viewing apparatus providing individual voltages representing the light intensity of a plurality of pixel positions within the viewing area, comprising:

a plurality of substantially identical smoothing elements, each of said smoothing elements comprising means for providing a fixed resistance to voltages thereacross which are below a pre-established threshold amount and an infinite resistance to voltages thereacross which are above said pre-established threshold amount;

a plurality of intersections comprising means for interconnecting each of said smoothing elements to equal numbered groups of others of said smoothing elements in a balanced network thereof, respective ones of the individual voltages being connected to respective ones of the intersections, each of said intersections having an output therefrom providing a smoothed voltage representing an associated pixel position.

12. The smoothing network for a machine vision system of claim 11 wherein:

said viewing apparatus is a phototransistor array disposed on a chip substrate and said balanced network is disposed on said chip substrate with said phototransistor array.

13. The smoothing network for a machine vision system of claim 11 wherein:

said network comprises a generally hexagonal structure wherein each said intersection is connected by six said elements to six other said intersections.

14. The smoothing network for a machine vision system of claim 11 wherein each said element comprises:

a) an absolute-value circuit having a pair of inputs for the connection of a pair of voltage inputs $V_1$ and $V_2$ from respective ones of a pair of said intersections thereto; and, b) a saturating resistor circuit connected across said pair of inputs and controlled by said absolute-value circuit to create a resistive fuse circuit.

15. The smoothing network for a machine vision system of claim 14 wherein:

a) said saturating resistor circuit has a pair of first transistors connected in series between said pair of inputs and a second transistor connected to control the flow of current through said first transistors; and b) said absolute-value circuit is connected to pull current from said saturating resistor circuit as a function of the absolute voltage difference between $V_1$ and $V_2$ and thereby control the amount of current said second transistor allows to flow through said first transistors.

16. The smoothing network for a machine vision system of claim 15 wherein:

said absolute-value circuit pulls current from said saturating resistor circuit on a linear basis below said pre-established threshold amount and rolls off to pull all current from said saturating resistor circuit upon reaching said pre-established threshold amount.

17. The smoothing network for a machine vision system of claim 15 and additionally comprising:

a gating transistor connected in series with said first transistors and connected to be operated by the current pulled by said absolute-value circuit from said saturating resistor circuit so that said absolute-value circuit pulls current from said saturating resistor circuit on a linear basis below said pre-established threshold amount whereby said first transistors pass current like a resistor and turns off said gating transistor upon reaching said pre-established threshold amount whereby said first transistors no longer pass current like an open fuse.

18. The smoothing network for a machine vision system of claim 15 wherein said first resistors provide an apparent resistance, and additionally comprising:

a control transistor connected to control the flow of current from said saturating resistor circuit whereby the slope of the apparent resistance of said first transistors is adjusted and set by a voltage applied to a gate of said control transistor.

19. The improvement to a system of claim 11 and additionally comprising:

input means associated with each of said identical smoothing elements for dynamically changing said pre-established threshold amount.

20. The improvement to a system of claim 19 and additionally comprising:

feedback means connected to said input means associated with each of said identical smoothing elements and to selected ones of the intersections to receive said smoothed voltage therefrom for dynamically changing said pre-established threshold amount as a function of pre-established conditions relating to the smoothed voltage from said selected ones of the intersections.

21. A video camera for use in machine vision systems and including a self-contained smoothing network which simultaneously recognizes and preserves discontinuities in data associated with a viewing area comprising:

a) a phototransistor array disposed on a chip substrate having a plurality of phototransistors thereon each providing a voltage output reflecting the intensity of light from a pixel position associated therewith impinging thereon;

b) lens means for viewing the viewing area and focusing light from a plurality of pixel positions within said viewing area on respective ones of said phototransistors;

c) a plurality of identical smoothing elements each interconnected to equal numbered groups of others of said elements at intersections with respective ones of said plurality of phototransistors having said voltage output thereof connected to a respective one of said intersections, each of said intersections having an output therefrom providing a smoothed voltage representing an associated pixel position, said output of said intersections in combination being the output of said video camera, each of said smoothing elements providing a fixed resistance to voltages thereacross which are below a pre-established threshold amount and providing an infinite resistance to voltages thereacross which are above said pre-established threshold amount.

22. The video camera for a machine vision system of claim 21 wherein:
said network comprises a generally hexagonal structure wherein each said intersection is connected by six said elements to six other said intersections.

23. The video camera for a machine vision system of claim 21 wherein each said element comprises:
a) an absolute-value circuit having a pair of inputs for the connection of a pair of voltage inputs $V_1$ and $V_2$ from respective ones of a pair of said intersections thereto; and,
b) a saturating resistor circuit connected across said pair of inputs and controlled by said absolute-value circuit to create a resistive fuse circuit.

24. The video camera for a machine vision system of claim 23 wherein:
a) said saturating resistor circuit has a pair of first transistors connected in series between said pair of inputs and a second transistor connected to control the flow of current through said first transistors; and,
b) said absolute-value circuit is connected to pull current from said saturating resistor circuit as a function of the absolute voltage difference between $V_1$ and $V_2$ and thereby control the amount of current said second transistor allows to flow through said first transistors.

25. The video camera for a machine vision system of claim 24 wherein:
said absolute-value circuit pulls current from said saturating resistor circuit on a linear basis below said pre-established threshold amount and rolls off to pull all current from said saturating resistor circuit upon reaching said pre-established threshold amount.

26. The video camera for a machine vision system of claim 24 and additionally comprising:
a gating transistor connected in series with said first transistors and connected to be operated by the current pulled by said absolute-value circuit from said saturating resistor circuit so that said absolute-value circuit pulls current from said saturating resistor circuit on a linear basis below said pre-established threshold amount whereby said first transistors pass current like a resistor and turns off said gating transistor upon reaching said pre-established threshold amount whereby said first transistors no longer pass current like an open fuse.

27. The video camera for a machine vision system of claim 24 wherein said first resistors provide an apparent resistance, and additionally comprising:
a control transistor connected to control the flow of current from said saturating resistor circuit whereby the slope of the apparent resistance of said first transistors is adjusted and set by a voltage applied to a gate of said control transistor.

28. The video camera for a machine vision system of claim 21 and additionally comprising:
input means associated with each of said identical smoothing elements for dynamically changing said pre-established threshold amount.

29. The video camera for a machine vision system of claim 28 and additionally comprising:
feedback means connected to said input means associated with each of said identical smoothing elements and to selected ones of the intersections to receive said smoothed voltage therefrom for dynamically changing said pre-established threshold amount as a function of pre-established conditions relating to the smoothed voltage from said selected ones of the intersections.

30. In a machine vision system having viewing means for viewing an area and for providing individual voltages representing the light intensity of a plurality of pixel positions within the area, the method of operation for smoothing the individual voltages and simultaneously recognizing and preserving discontinuities in the area comprising the steps of:
a) connecting respective ones of the individual voltages to respective ones of a plurality of intersections of a balanced network of identical smoothing elements interconnected at intersections;
b) allowing currents from the individual voltages to pass through the smoothing elements between the intersections and settle;
c) within each element, providing a fixed resistance to voltages thereacross which are below a pre-established threshold amount and providing an infinite resistance to voltages thereacross which are above the pre-established threshold amount whereby as the currents flow the individual voltages are smoothed and discontinuities in the area reflected in the individual voltages are simultaneously recognized and preserved rather than being smoothed over; and, 31. The method of claim 30 and additionally comprising the steps of:
a) analyzing the individual smoothed voltages from the intersections to determine pixels associated with possible discontinuities; and,
b) dynamically lowering said threshold amount in ones of the elements associated with pixels having possible discontinuities associated therewith whereby sensitivity to recognition of discontinuities is increased.

* * * * *